(12) United States Patent
Ginder

(10) Patent No.: US 7,347,306 B2
(45) Date of Patent: Mar. 25, 2008

(54) APPARATUS AND METHOD FOR OPERATING A TAKE-UP MECHANISM IN A LOCOMOTIVE BRAKING SYSTEM

(75) Inventor: William F. Ginder, Roanoke, VA (US)

(73) Assignee: Graham-White Manufacturing Company, Salem, VA (US)

( * ) Notice: Subject to any disclaimer, the term of this patent is extended or adjusted under 35 U.S.C. 154(b) by 233 days.

(21) Appl. No.: 11/301,265

(22) Filed: Dec. 12, 2005

(65) Prior Publication Data

US 2007/0131497 A1 Jun. 14, 2007

(51) Int. Cl.
*B60L 7/00* (2006.01)
(52) U.S. Cl. .................. 188/162; 188/34; 188/265; 188/156; 303/20
(58) Field of Classification Search ............... 188/162, 188/33, 34, 69, 73.1, 265, 197, 156, 157; 303/20
See application file for complete search history.

(56) References Cited

U.S. PATENT DOCUMENTS

| | | | | |
|---|---|---|---|---|
| 1,491,753 A | * | 4/1924 | Sauvage | ..................... 188/156 |
| 2,834,443 A | | 5/1958 | Olchawa | |
| 3,667,578 A | | 6/1972 | Johnson | |
| 4,291,793 A | * | 9/1981 | Klasing | ....................... 192/95 |
| 4,944,372 A | | 7/1990 | Taig | |
| 5,178,237 A | * | 1/1993 | Ursel et al. | ................. 188/157 |
| 6,039,158 A | | 3/2000 | Fox et al. | |
| 6,427,811 B1 | | 8/2002 | Wedge et al. | |
| 6,769,527 B1 | | 8/2004 | Paris | |
| 6,913,325 B2 | | 7/2005 | Michel et al. | |
| 6,974,015 B2 | | 12/2005 | Gamache | |
| 7,073,638 B2 | | 7/2006 | Daniel | |
| 2007/0131049 A1 | | 6/2007 | Ginder | |

* cited by examiner

*Primary Examiner*—Melanie Torres
(74) *Attorney, Agent, or Firm*—Dority & Manning, P.A.

(57) ABSTRACT

The present invention discloses and claims an apparatus and method for operating a take-up mechanism. The system includes electric and manual actuating mechanisms engaged with a combiner mechanism to apply force to the take-up mechanism. In a first mode of operation, the combiner mechanism transmits rotation from the electric actuating mechanism, and in a second mode of operation, the combiner mechanism transmits rotation from the manual actuating mechanism. The method for operating the take-up mechanism uses a motor and a manual input shaft connected to a gear to operate the take-up mechanism in the first and second modes. The motor is engaged with the gear during at least the second mode of operation.

20 Claims, 8 Drawing Sheets

APPARATUS AND METHOD FOR OPERATING A TAKE-UP MECHANISM IN A LOCOMOTIVE BRAKING SYSTEM

BACKGROUND OF THE INVENTION

The present invention relates generally to an apparatus and method for operating a take-up mechanism. Although described and illustrated in the context of a take-up mechanism for a locomotive braking system, one of ordinary skill in the art should appreciate that the present invention may be used to operate any take-up mechanism used to set and release force.

A locomotive is a relatively heavy vehicle conveyed on tracks by wheels. Uncontrolled or inadvertent movement of the locomotive may result in serious injury or damage to adjacent locomotives, railcars, people, or any other item in the path of movement. Therefore, the rail industry requires that all locomotives have a brake system for preventing uncontrolled or inadvertent movement.

Locomotives typically use a parking brake for holding the locomotive for extended periods. The parking brake generally includes a brake surface, such as brake shoes or disks, that can be applied to the locomotive wheels to slow or stop the locomotive. An actuating mechanism connects to the brake surface to set and release the parking brake. The actuating mechanism may include a manual and/or a motorized input device to set and release the parking brake. The manual input device may be a lever or a hand wheel that connects to a ratcheted drive shaft, and a chain or cable may connect the ratcheted drive shaft to the brake surface. In this manner, the ratcheted drive shaft may rotate in one direction to set the parking brake. A release mechanism may disengage the ratchet from the drive shaft to allow the drive shaft to freely rotate to release the parking brake.

Operation of the manual input device and release mechanism requires the operator to be physically present at the parking brake to both set and release the parking brake. In addition, substantial effort and agility are required to properly set and release the parking brake. As a result, some operators are not able to manually operate the parking brake without risking or incurring physical injuries and strains. Moreover, an injured operator may be unable to manually operate the parking brake in an emergency.

U.S. Pat. No. 6,039,158 describes a system for operating a locomotive parking brake that includes both a manual and motorized input device to set the parking brake. The manual input device is a lever or hand wheel that rotates a drive shaft to set the parking brake, and the motorized input device includes a motor to rotate the drive shaft to set the parking brake, as previously described. The motorized input device may further include a motor controller located remote from the parking brake. In this manner, the operator may set the parking brake locally using either the manual or motorized input device. In addition, the operator may set the parking brake remotely using the motor controller. However, the operator must still manually operate a separate release lever located on the system to release the parking brake. As a result, the parking brake can only be released manually by the operator at the parking brake, and the inconvenience and potential for injury still exists.

U.S. Pat. No. 6,913,325 describes a system for operating a vehicle parking brake that includes both a hand wheel and a motor to operate the parking brake. In contrast to U.S. Pat. No. 6,039,158, the operator can both set and release the parking brake locally or remotely from the system using the motor. Alternately, the operator can reposition a lever on the system to disengage the motor and engage the hand wheel to both set and release the parking brake manually. Although the system described in U.S. Pat. No. 6,913,325 provides for both manual and motorized operation of the parking brake, the operator must still manually reposition the lever on the system to switch between manual operation and motorized operation. As a result, motorized and/or remote operation of the parking brake is not possible if the lever is left in the manual position.

Therefore, the need exists for an apparatus and method to operate a take-up mechanism both locally and remotely without requiring any adjustment to the mechanism to allow local or remote operation.

SUMMARY OF THE INVENTION

Objects and advantages of the invention are set forth below in the following description, or may be obvious from the description, or may be learned through practice of the invention.

The present invention provides an apparatus for operating a take-up mechanism in a locomotive braking system. In one embodiment, the apparatus includes a plate that defines first and second surfaces and a first brake configured for releasable engagement with the plate. The apparatus further includes a first set of depressions on the first surface of the plate and a second set of depressions on the second surface of the plate. A gear is configured for engagement with the first set of depressions on the first surface of the plate so that torque applied to the first set of depressions from the gear increases the engagement between the first brake and the plate. A motor is configured for engagement with the gear so that the gear transmits rotation and torque from the motor to the take-up mechanism in a first mode of operation. A manual input shaft is configured for engagement with the second set of depressions on the second surface of the plate so that the plate transmits rotation and torque from the manual input shaft to the gear to set and release the take-up mechanism in a second mode of operation. The motor is engaged with the gear during the second mode of operation when setting and releasing the take-up mechanism.

In particular embodiments, the motor may be engaged with the gear during the first mode of operation when setting and releasing the take-up mechanism. The apparatus may further include a second brake engaged with the motor when the motor is de-energized to inhibit rotation of the motor when the motor is de-energized. Additional embodiments may further include an electronic control circuit in operative engagement with either the motor and/or the second brake for operating the take-up mechanism in the first mode of operation. In other particular embodiments, either the first set of depressions and/or the second set of depressions may define a conical surface or a concave surface. Still further embodiments may include a set of actuating balls in either the first set of depressions and/or the second set of depressions.

The present invention also includes an apparatus for operating a take-up mechanism. The apparatus includes a plate that defines first and second surfaces and a first brake in biased engagement with the plate. A gear is configured for engagement with the first surface of the plate, and a motor is configured for engagement with the gear so that the gear transmits rotation and torque from the motor to the take-up mechanism in a first mode of operation. The apparatus further includes a second set of depressions on the second surface of the plate and a manual input shaft configured for engagement with the second set of depressions on the second surface of the plate so that torque applied to the manual input shaft in either direction decreases the biased engagement between the first brake and the plate, allowing the plate to transmit rotation and torque from the manual input shaft to the gear to set and release the take-up mechanism in a second mode of operation. The motor is engaged with the gear during the second mode of operation when setting and releasing the take-up mechanism.

In the alternate embodiment, the motor may be engaged with the gear during the first mode of operation when setting and releasing the take-up mechanism. The alternate embodiment may further include a second brake engaged with the motor when the motor is de-energized to inhibit rotation of the motor when the motor is de-energized. The apparatus may further include an electronic control circuit in operative engagement with the motor and/or the second brake for operating the take-up mechanism in the first mode of operation. In particular embodiments, the second set of depressions may define a conical surface or a concave surface. Still further embodiments may include a set of actuating balls in the second set of depressions and/or a first set of depressions on the first surface of the plate.

The present invention also includes a method for operating a take-up mechanism. In one embodiment, the method includes energizing a motor engaged with a gear to rotate the gear to set the take-up mechanism in a first mode of operation. The method further includes manually rotating a manual input shaft engaged with the gear in a first direction to set the take-up mechanism and in a second direction to release the take-up mechanism in a second mode of operation. The method maintains engagement between the motor and the gear during the second mode of operation to set and release the take-up mechanism.

In particular embodiments, the method may further include maintaining engagement between the motor and the gear during the first mode of operation to set and release the take-up mechanism. In addition, the method may include engaging a brake to the motor when the motor is de-energized to inhibit rotation of the motor when the motor is de-energized. The method may further include disengaging the brake from the motor to release the take-up mechanism in the first mode of operation. In another particular embodiment, the method may include energizing the motor to rotate the gear to re-set the take-up mechanism in the first mode of operation.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
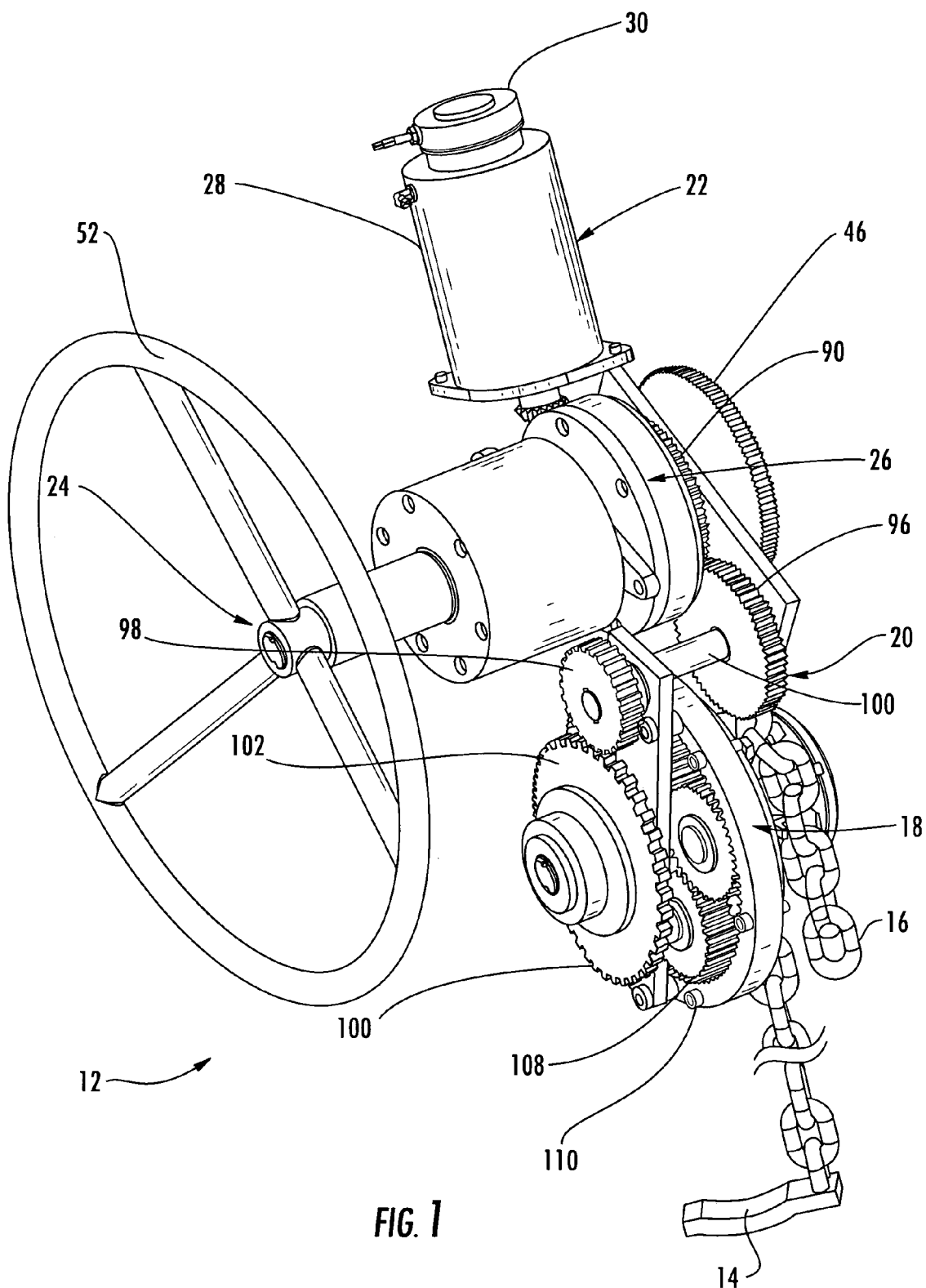
FIG. 1 is a perspective view of an embodiment of the present invention.

Repeat use of reference characters in the present specification and drawings is intended to represent the same or analogous features or elements of embodiments of the invention.

DETAILED DESCRIPTION

Reference will now be made in detail to present embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is compatible for use with any device that uses a take-up mechanism, such as a locomotive parking brake, although such is not a specific limitation of the present disclosure. FIG. 1 illustrates a perspective view of an apparatus 12 for operating a take-up mechanism 18 in a locomotive braking system according to one embodiment of the present invention. The take-up mechanism 18 may attach to a brake surface 14, such as a brake shoe or disk, connected to the take-up mechanism 18 by a chain 16. An idler assembly 20 may then connect the take-up mechanism 18 to the system 12.

As illustrated in the embodiment shown in FIG. 1, the apparatus 12 may include an electric actuating mechanism 22, a manual actuating mechanism 24, and a combiner mechanism 26. In a first mode of operation, the combiner mechanism 26 may receive input from the electric actuating mechanism 22. In a second mode of operation, the combiner mechanism 26 may receive input from the manual actuating mechanism 24. In a third mode of operation, the combiner mechanism 26 may receive simultaneous input from both the manual actuating mechanism 24 and the electric actuating mechanism 22.

Figure 2:
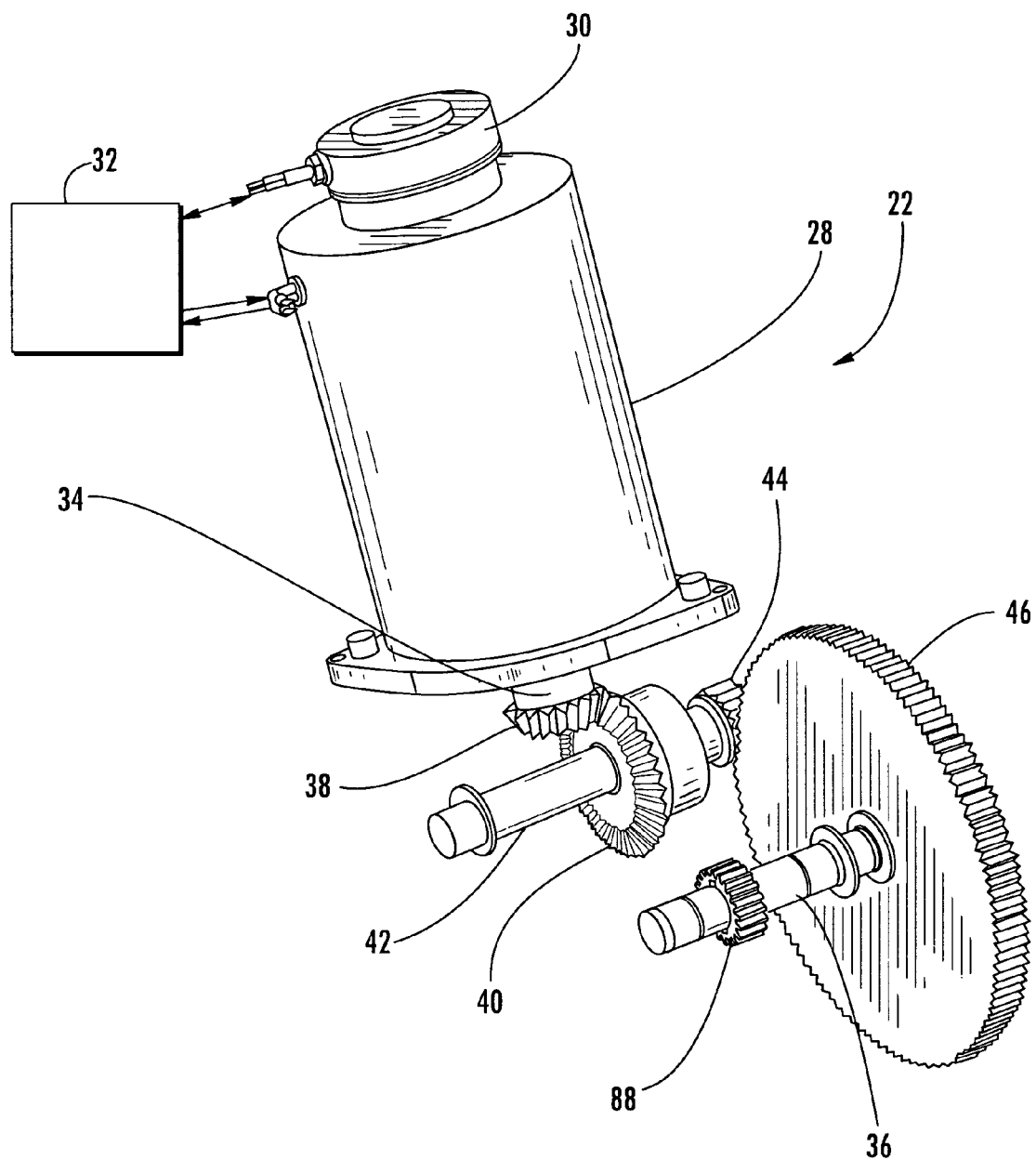
FIG. 2 is a perspective view of an electric actuating mechanism constructed according to an embodiment of the present invention.

FIG. 2 illustrates the electric actuating mechanism 22 constructed according to an embodiment of the present invention. In this embodiment, the electric actuating mechanism 22 includes a motor 28, a motor brake 30, and an electronic control circuit 32. The motor 28 is configured for engagement to a motor output shaft 34 and a motor driven shaft 36. As will be shown in more detail later, rotation of the motor driven shaft 36 in a first direction sets the take-up mechanism 18, and rotation of the motor driven shaft 36 in a second direction releases the take-up mechanism 18.

The motor 28 may be an electrical, hydraulic, or pneumatic motor capable of rotating clockwise and counterclockwise. The size of the motor 28 generally depends on the gear ratio between the motor 28 and the motor driven shaft 36. In general, the torque provided by the motor driven shaft 36 produces a torque output from the combiner mechanism 26 that is approximately equal to the torque generated by the combiner mechanism 26 from input from the manual actuating mechanism 24. For example, a motor capable of generating approximately 30 inch-pounds of torque would be appropriate for a gear ratio of 12 to 1 between the motor 28 and the motor driven shaft 36.

The motor 28 may be configured for engagement with the motor driven shaft 36 through a pinion and gear arrangement, as shown in the embodiment illustrated in FIG. 2. As shown in FIG. 2, a bevel pinion 38 on the motor output shaft 34 engages a bevel gear 40 fixedly connected to one end of a connecting shaft 42. A first spur gear 44 fixedly connected to the other end of the connecting shaft 42 engages with a second spur gear 46 fixedly connected to the motor driven shaft 36. Thus, the motor output shaft 34 transmits rotation from the motor 28 through the pinion and gear arrangement to the motor driven shaft 36.

The gear ratio between the motor output shaft 34 and the motor driven shaft 36 provides a further increase between the torque of the motor 28 and the desired torque of the motor driven shaft 36. A suitable reduction ratio for the pinion and gear arrangement shown in FIG. 2 may be 12 to 1, although other ratios may be used, depending on the particular motor 28 being used.

The motor brake 30 may be a mechanical stop, a magnetic coupling, or any other device suitable for inhibiting rotation. The motor brake 30 may be configured for releasable engagement with the motor 28, motor output shaft 34, or motor driven shaft 36, depending on the particular embodiment. When engaged, the motor brake 30 inhibits free rotation of the motor 28, motor output shaft 34, and motor driven shaft 36.

The electronic control circuit 32 controls the operation of the motor 28 and motor brake 30. The electronic control circuit 32 may include optional sensors and logic circuitry to monitor the operation of the apparatus 12. For example, the electronic control circuit 32 may include sensors that measure the electric current, hydraulic pressure, or air pressure drawn by the motor 28 as an indication of the amount of force applied by the take-up mechanism 18. Alternately, the sensors may detect the force applied by the combiner mechanism 26, take-up mechanism 18, chain 16, brake surface 14, or any other component in the apparatus 12 indicative of the amount of force being applied by the take-up mechanism 18. The electronic control circuit 32 may also include sensors that detect the position of the brake surface 14, chain 16, take-up mechanism 18, or any other component in the apparatus 12 indicative of the position or status of the apparatus 12.

To set the take-up mechanism 18 in the first mode of operation, the electronic control circuit 32 disengages the motor brake 30 and energizes the motor 28 to rotate the motor driven shaft 36 clockwise as viewed from the left in FIG. 2. When the take-up mechanism 18 has been adequately set, the electronic control circuit 32 de-energizes the motor 28 and engages the motor brake 30 to inhibit free rotation of the motor 28, motor output shaft 34, and motor driven shaft 36.

To release the take-up mechanism 18 in the first mode of operation, the electronic control circuit 32 electrically shorts the motor 28 and disengages the motor brake 30. With the motor brake 30 disengaged, the reactive force in the apparatus 12, i.e., the elasticity in the chain 16, take-up mechanism 18, idler assembly 20, and/or combiner mechanism 26, causes the motor driven shaft 36 to rotate counter-clockwise to release the force applied by the take-up mechanism 18. Counter-clockwise rotation of the motor driven shaft 36 causes the electrically shorted motor 28 to rotate, generating counter-electromagnetic force in the motor 28. The counter-electromagnetic force generated by the motor 28 dampens the rotation of the motor driven shaft 36 and produces a smooth release of the take-up mechanism 18. After the elasticity in the apparatus 12 and the force applied by the take-up mechanism 18 have been released, for example after approximately 12 seconds, the electronic control circuit 32 removes the electrical short from the motor 28 and energizes the motor 28 to rotate the motor driven shaft 36 counter-clockwise to create slack in the chain 16 and re-set the take-up mechanism 18 for subsequent operation. When the take-up mechanism 18 has been re-set, as determined, for example, by timed counter-clockwise operation of the motor 28 or by optional sensors in the electronic control circuit 32, the electronic control circuit 32 de-energizes the motor 28 and engages the motor brake 30.

Figure 3:
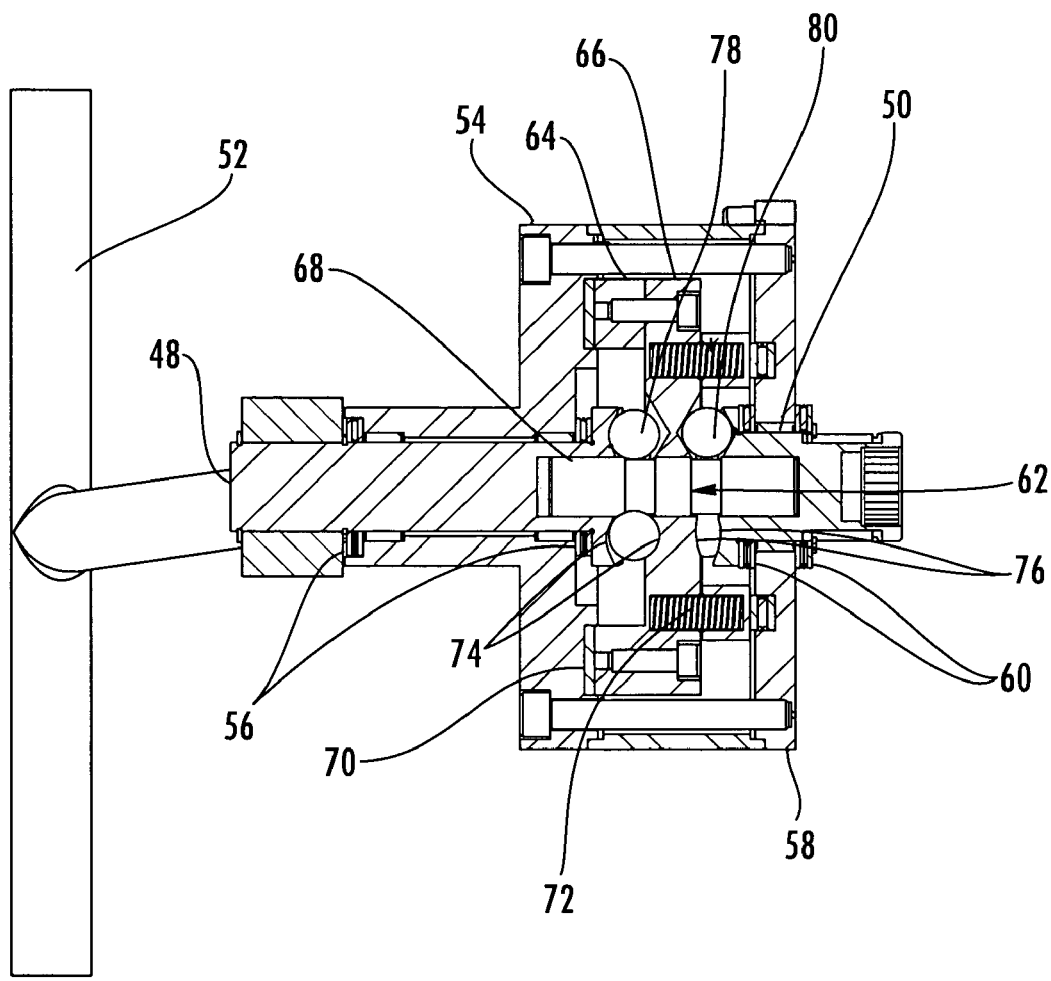
FIG. 3 is a simplified plan view of a manual actuating mechanism constructed according to an embodiment of the present invention.

FIG. 3 illustrates the manual actuating mechanism 24 constructed according to an embodiment of the present invention. The manual actuating mechanism 24 may include a manual input shaft 48 configured for engagement with a manually driven shaft 50 to rotate the manually driven shaft 50. The manual input shaft 48 may be connected to a hand wheel 52, as shown in FIG. 3, a lever, or equivalent substitute. A cover 54 and thrust bearings 56 prevent the manual input shaft 48 from moving axially. A thrust cap 58 and thrust bearings 60 prevent the manually driven shaft 50 from moving axially. As will be shown in more detail later, rotation of the manual input shaft 48 in a first direction sets the take-up mechanism 18, and rotation of the manual input shaft 48 in a second direction releases the take-up mechanism 18.

Figure 4:
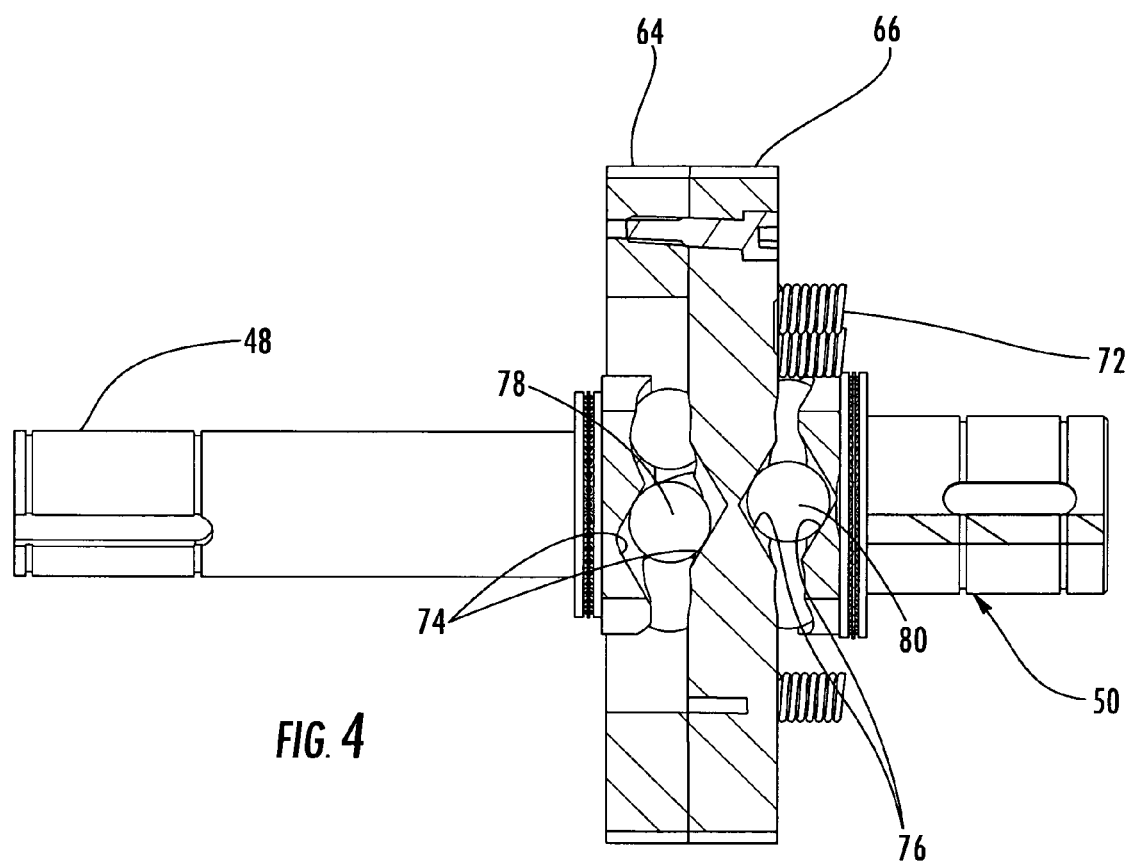
FIG. 4 is a simplified plan view of the torque transfer mechanism shown in FIG. 3.

As shown in the embodiment illustrated in FIGS. 3 and 4, the manual input shaft 48 may be configured for engagement with the manually driven shaft 50 through a torque transfer mechanism 62. The torque transfer mechanism 62 transmits rotation and torque from the manual input shaft 48 to the manually driven shaft 50. However, the torque transfer mechanism 62 clamps the manually driven shaft 50 and inhibits rotation and torque from the manually driven shaft 50 from being transmitted to the manual input shaft 48. As a result, the torque transfer mechanism 62 allows the manual input shaft 48 to rotate the manually driven shaft 50 in either direction. However, the torque transfer mechanism 62 inhibits the manually driven shaft 50 from rotating in either direction unless the manual input shaft 48 is rotating in the same direction and at the same speed as the manually driven shaft 50.

In the embodiment shown in FIGS. 3 and 4, a wear ring 64 is fixedly joined to a pressure plate 66 between the manual input shaft 48 and manually driven shaft 50. The wear ring 64 and pressure plate 66 are capable of slight axial movement to the right and left, as viewed in FIGS. 3 and 4. An alignment shaft 68 aligns the pressure plate 66, manual input shaft 48, and manually driven shaft 50, while permitting slight rotational and axial movement between the pressure plate 66 and either of the manual input shaft 48 and the manually driven shaft 50. A friction disk 70 is located between the cover 54 and the pressure plate 66. Springs 72 bias the pressure plate 66 and wear ring 64 away from the manually driven shaft 50 and against the friction disk 70 to create a slight clamping force between the pressure plate 66, friction disk 70, and cover 54.

The pressure plate 66 includes a circular pattern of depressions 74, 76, countersinks, indentations, or cam surfaces on opposing sides. The depressions 74, 76 may be conical, concave, or convex. The depressions 74, 76 are mirrored in the opposing surfaces of the manual input shaft 48 and manually driven shaft 50, respectively, to form complementary surfaces. Actuating balls 78, 80 in the cavities formed by the depressions 74, 76 may be used to contact opposing surfaces of the depressions 74, 76 to impart axial forces on the pressure plate 66, depending on the rotation and torque applied to the manual input shaft 48 and the manually driven shaft 50. It should be understood by one of ordinary skill in the art, that the springs 72 may provide sufficient bias on the pressure plate 66 away from the manually driven shaft 50 so that alternate embodiments within the scope of the present invention may include depressions 74 on only the manual input shaft 48 side of the pressure plate 66. In addition, the presence of actuating balls in the cavities formed by the depressions is an optional feature to reduce friction between opposing surfaces of the depressions.

For example, when torque is applied to the manual input shaft 48, the slight rotational movement between the manual input shaft 48 and the pressure plate 66 causes the actuating balls 78 to contact opposing surfaces of the depressions 74 to impart an axial force on the pressure plate 66 away from the manual input shaft 48. This axial force on the pressure plate 66 away from the manual input shaft 48 reduces the clamping force between the pressure plate 66, friction disk 70, and cover 54. The clamping force will be completely removed when the axial force on the pressure plate 66 away from the manual input shaft 48 (i.e., from torque applied to the manual input shaft 48) is greater than the axial force on the pressure plate 66 away from the manually driven shaft 50 (i.e., from the torque applied to the manually driven shaft 50 combined with the axial force of the springs 72). When the clamping force is completely removed, the torque transfer mechanism 62 will transfer rotation and torque from the manual input shaft 48, through the actuating balls 78, 80 and pressure plate 66, to the manually driven shaft 50.

Conversely, when torque is applied to the manually driven shaft 50 from the combiner mechanism 26, the slight rotational movement between the manually driven shaft 50 and the pressure plate 66 causes the actuating balls 80 to contact opposing surfaces in the depressions 76 to impart an axial force on the pressure plate 66 away from the manually driven shaft 50. This axial force on the pressure plate 66 away from the manually driven shaft 50 increases the clamping force between the pressure plate 66, friction disk 70, and cover 54 to inhibit the manually driven shaft 50 from further rotation.

Figure 5:
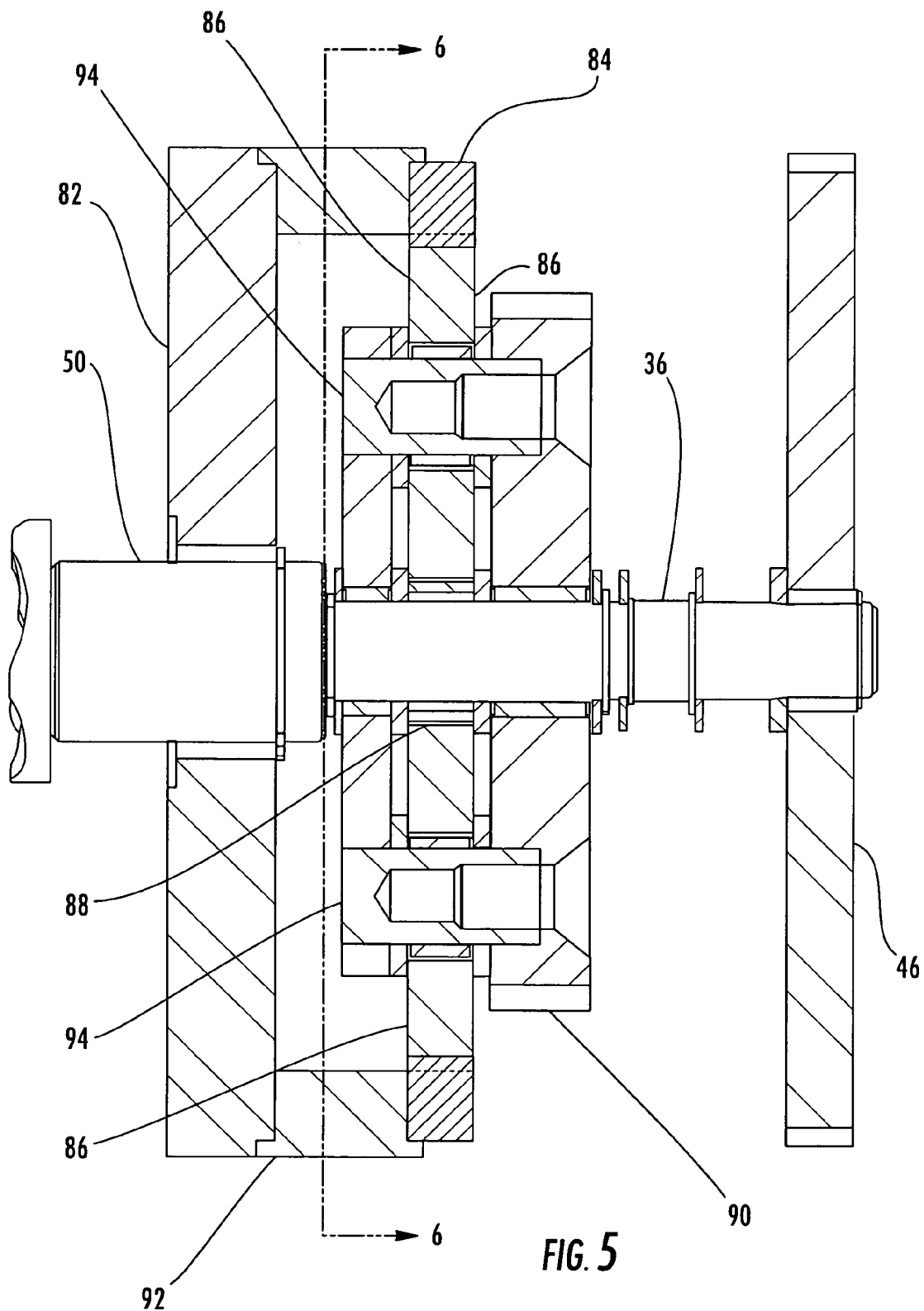
FIG. 5 is a simplified plan view of a combiner mechanism constructed according to an embodiment of the present invention.
Figure 6:
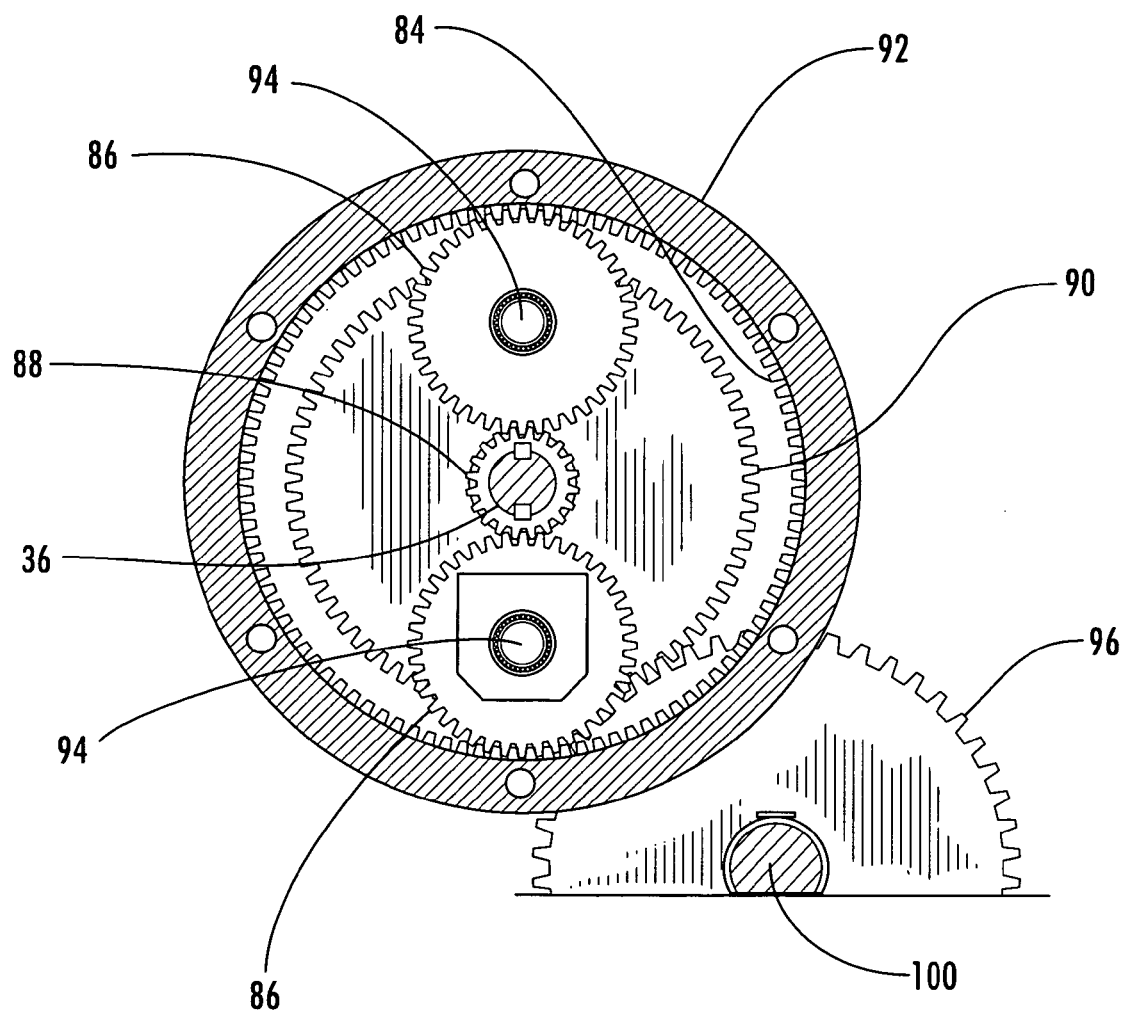
FIG. 6 is a cross-section view of the combiner mechanism shown in FIG. 5 along line 6-6.

FIGS. 5 and 6 illustrate the combiner mechanism 26 constructed according to an embodiment of the present invention. In the embodiment of the combiner mechanism 26 shown in FIGS. 5 and 6, the combiner mechanism 26 includes a ring drive plate 82, a ring gear 84, planetary gears 86, a sun gear 88, and a combiner output gear 90. Spacer 92 fixedly connects the ring drive plate 82 to the ring gear 84 so that the ring drive plate 82 rotates with the ring gear 84. The ring gear 84 is in toothed engagement with the planetary gears 86, and the planetary gears 86 in turn are in toothed engagement with the sun gear 88. The planetary gears 86 rotate about idler shafts 94 which are fixedly connected to the combiner output gear 90 so that rotation of the planetary gears 86 about the sun gear 88 drives the combiner output gear 90. In this manner, rotation of either the ring gear 84 or the sun gear 88 will cause the planetary gears 86 to rotate about the sun gear 88, thus causing rotation of the combiner output gear 90.

As shown in FIG. 5, the manually driven shaft 50 fixedly connects to the ring drive plate 82, thus connecting the manual actuating mechanism 24 to the combiner mechanism 26. Similarly, the motor driven shaft 36 fixedly connects to the sun gear 88, thus connecting the electric actuating mechanism 22 to the combiner mechanism 26.

Figure 7:
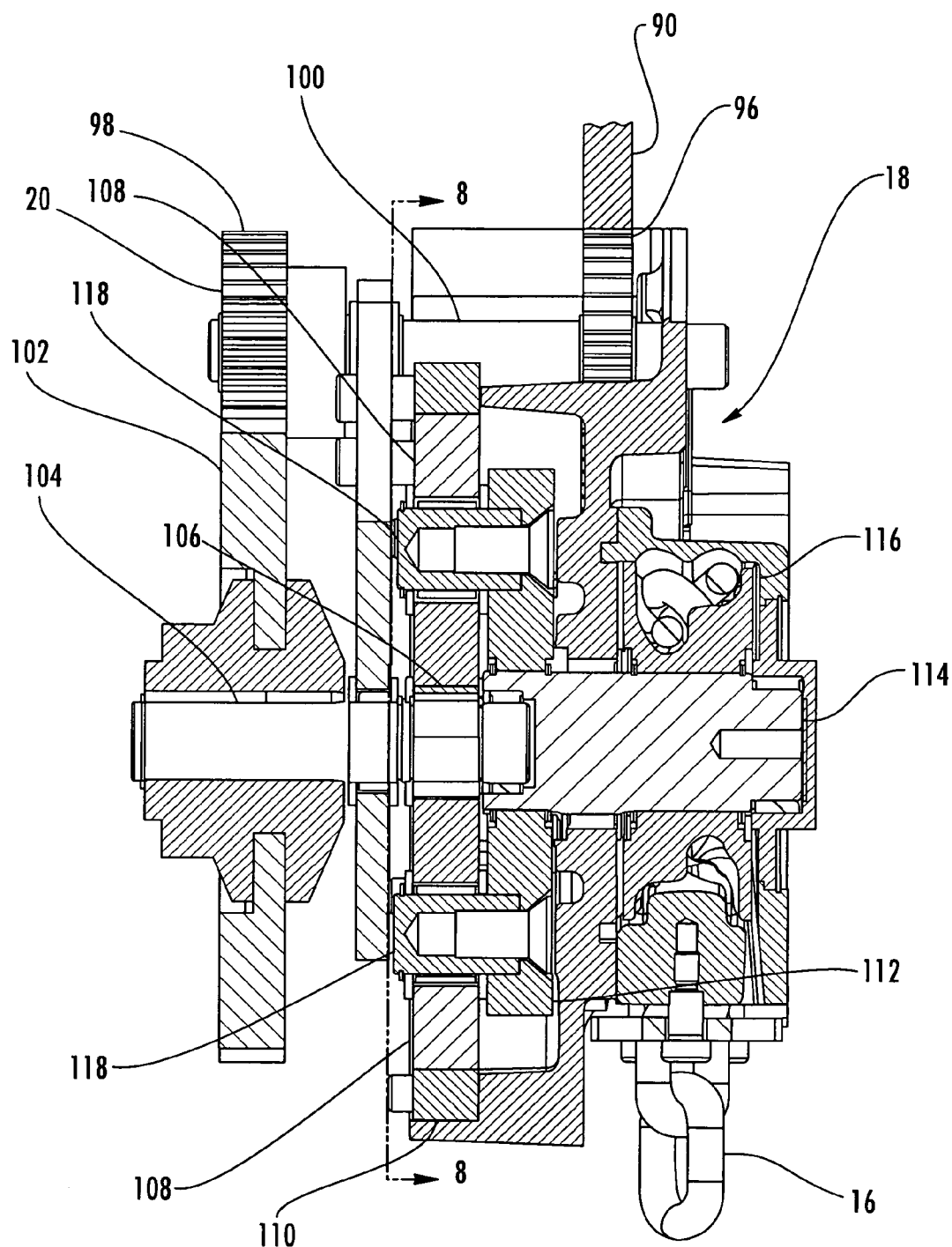
FIG. 7 is a plan view of a take-up mechanism constructed according to an embodiment of the present invention.
Figure 8:
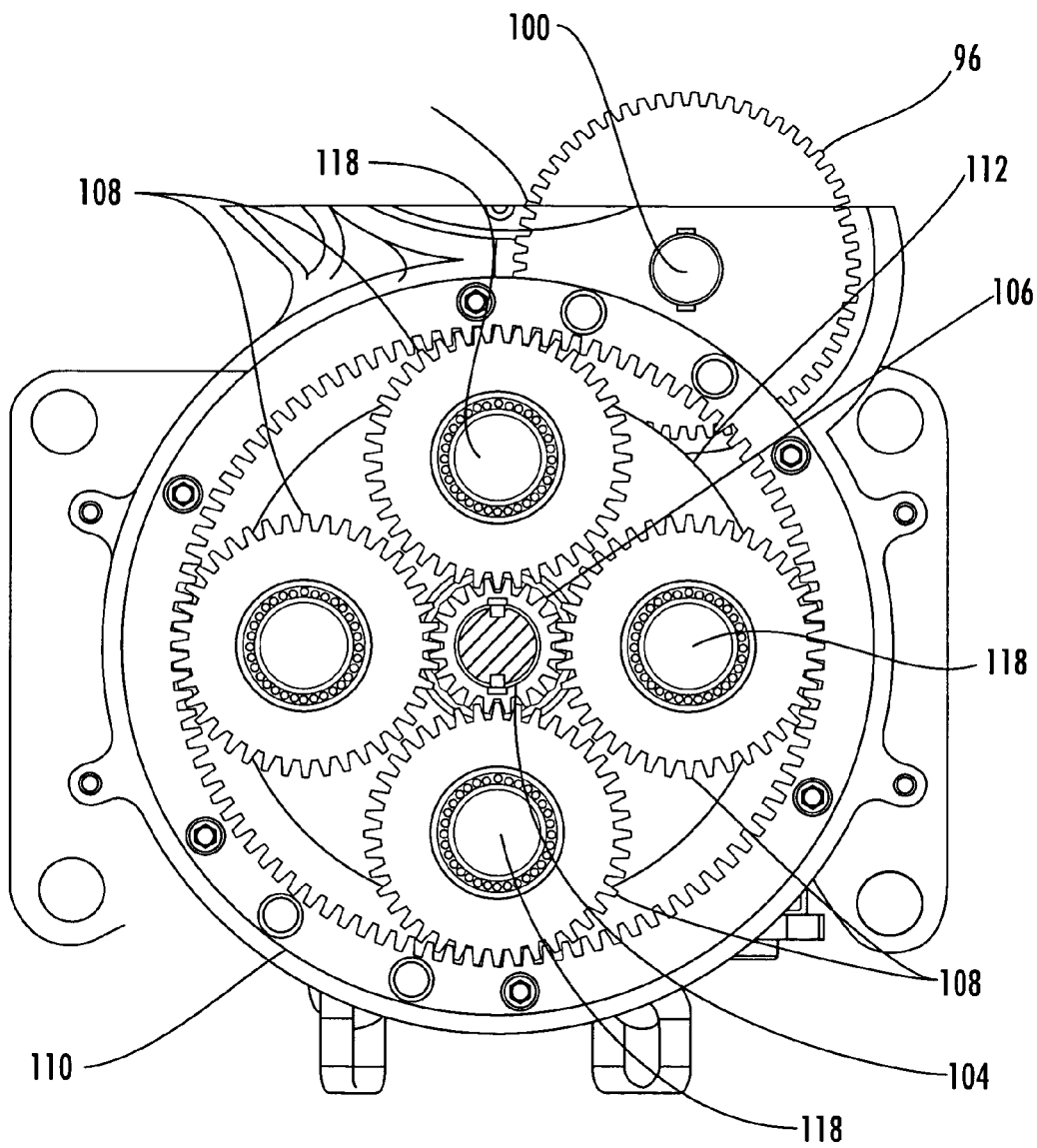
FIG. 8 is a cross-section view of the take-up mechanism shown in FIG. 7 along line 8-8.

FIGS. 7 and 8 illustrate the take-up mechanism 18 constructed according to an embodiment of the present invention. As shown in FIG. 7, the idler assembly 20 connects the combiner output gear 90 to the take-up mechanism 18. The idler assembly 20 may include any gear or sprocket and chain arrangement for transferring rotation from the combiner output gear 90 to the take-up mechanism 18. In the embodiment shown in FIGS. 1 and 7, the idler assembly 20 includes a first idler gear 96 fixedly connected to a second idler gear 98 by an idler shaft 100. The first idler gear 96 is in toothed engagement with the combiner output gear 90, and the second idler gear 98 is in toothed engagement with the take-up mechanism 18. Thus, the idler assembly 20 transmits rotation from the combiner output gear 90 to the take-up mechanism 18.

In the embodiment of the take-up mechanism 18 shown in FIGS. 7 and 8, the take-up mechanism 18 includes a drive gear 102, a drive shaft 104, a sun gear 106, planetary gears 108, a fixed ring gear 110, a cage plate 112, an output shaft 114, and an output sprocket 116. The drive gear 102 fixedly connects to the drive shaft 104, and the drive shaft 104 in turn fixedly connects to the sun gear 106. The sun gear 106 is in toothed engagement with the planetary gears 108, and the planetary gears 108 in turn are in toothed engagement with the fixed ring gear 110. The planetary gears 108 rotate about idler shafts 118 which are fixedly connected to the cage plate 112 so that the planetary gears 108 rotate with the cage plate 112. The cage plate 112 fixedly connects to the output shaft 114, and the output shaft 114 in turn fixedly connects to the output sprocket 116.

The chain 16 wraps around the output sprocket 116. The chain 16 may be wrapped around the output sprocket 116 with links alternately parallel and perpendicular to the sprocket axis. In this manner, only the parallel links transmit load from the output sprocket 116 to the chain 16. Alternately, the chain 16 may be wrapped around the output sprocket 116 with the links at 45 degree angles to the sprocket axis at alternating opposite inclinations. As a result, each link transmits a portion of the load from the output sprocket 116 to the chain 16.

In this manner, rotation of the drive gear 102 and drive shaft 104 rotates the sun gear 106. As the fixed ring gear 110 does not rotate, rotation of the sun gear 106 in turn causes the planetary gears 108 to rotate about the sun gear 106. As the planetary gears 108 rotate about the sun gear 106, the planetary gears 108 rotate the cage plate 112, output shaft 114, and output sprocket 116. Rotation of the output sprocket 116 draws up or releases the chain 16 to set and release the brake surface 14.

The apparatus for operating the take-up mechanism 18 in the first mode using the electric actuating mechanism 22 will now be described with reference to the embodiments shown in FIGS. 1-8. To set the take-up mechanism 18 electrically, the electronic control circuit 32 disengages the motor brake 30 and energizes the motor 28 to rotate the motor output shaft 34 counter-clockwise as viewed from the top of the motor 28 in FIG. 2. Counter-clockwise rotation of the motor output shaft 34 causes the bevel pinion 38 to rotate counter-clockwise which in turn causes the bevel gear 40 to rotate counter-clockwise. The bevel gear 40 fixedly connects to the connecting shaft 42 and first spur gear 44, causing the first spur gear 44 to rotate counter-clockwise. The first spur gear 44 is in toothed engagement with the second spur gear 46, resulting in clockwise rotation of the second spur gear 46. The second spur gear 46 fixedly connects to the motor driven shaft 36, resulting in clockwise rotation of the motor driven shaft 36.

Referring to FIG. 6, the motor driven shaft 36 fixedly connects to the sun gear 88, resulting in clockwise rotation of the sun gear 88. Clockwise rotation of the sun gear 88 causes the planetary gears 86 to rotate counter-clockwise about the idler shafts 94. Counter-clockwise rotation of the planetary gears 86 initially causes the ring gear 84 to rotate counter-clockwise.

Referring to FIG. 5, the ring gear 84 fixedly connects to the ring drive plate 82 and manually driven shaft 50. Therefore, the initial counter-clockwise rotation of the ring gear 84 causes the ring drive plate 82 and manually driven shaft 50 to initially rotate counter-clockwise as viewed from the left in FIG. 5.

Referring to FIGS. 3 and 4, as the manually driven shaft 50 initially rotates counter-clockwise, the biased clamping force between the pressure plate 66, friction disk 70, and cover 54 results in slight rotational movement between the manually driven shaft 50 and the pressure plate 66. The slight rotational movement between the manually driven shaft 50 and the pressure plate 66 causes the actuating balls 80 to contact opposing surfaces in the depressions 76. The angle of the contact point of the actuating balls 80 with the opposing surfaces in the depressions 76 imparts additional axial force on the pressure plate 66 away from the manually driven shaft 50, further increasing the clamping force between the pressure plate 66, friction disk 70, and cover 54. The increased clamping force between the pressure plate 66, friction disk 70, and cover 54 rotationally binds the manually driven shaft 50 to the clamped pressure plate 66 through the actuating balls 80 and inhibits further counter-clockwise rotation of the manually driven shaft 50. As the manually driven shaft 50 fixedly connects to the ring drive plate 82 and ring gear 84, the rotationally bound manually driven shaft 50 inhibits further counter-clockwise rotation of the drive plate 82 and ring gear 84.

Returning to FIG. 6, continued clockwise rotation of the sun gear 88 causes the planetary gears 86 to continue to rotate counter-clockwise about the idler shafts 94. As the rotationally bound manually driven shaft 50 now inhibits the ring gear 84 from further counter-clockwise rotation, the counter-clockwise rotation of the planetary gears 86 about the idler shafts 94 thus causes the planetary gears 86 to collectively rotate clockwise around the sun gear 88. The planetary gears 86 are fixedly connected to the combiner output gear 90, resulting in clockwise rotation of the combiner output gear 90.

Referring to FIGS. 1 and 7, the idler assembly 20 transmits rotation of the combiner output gear 90 to the take-up mechanism 18. Clockwise rotation of the combiner output gear 90 causes the first idler gear 96 to rotate counter-clockwise. The first idler 96 gear fixedly connects to the idler shaft 100 and second idler gear 98, causing the second idler gear 98 to rotate counter-clockwise. Counter-clockwise rotation of the second idler gear 98 causes the drive gear 102 to rotate clockwise.

Referring to FIGS. 7 and 8, the drive gear 102 fixedly connects to the drive shaft 104 and sun gear 106. As a result, clockwise rotation of the drive gear 102 causes the drive shaft 104 and sun gear 106 to rotate clockwise. The sun gear 106 is in toothed engagement with the planetary gears 108, and the planetary gears 108 in turn are in toothed engagement with the fixed ring gear 110. Clockwise rotation of the sun gear 106 causes the planetary gears 108 to rotate counter-clockwise about the idler shafts 118. As the fixed ring gear 110 does not rotate, the counter-clockwise rotation of the planetary gears 108 about the idler shafts 118 thus causes the planetary gears 108 to collectively rotate clockwise around the sun gear 106. The planetary gears 108 fixedly connect to the cage plate 112, and the cage plate 112 fixedly connects to the output sprocket 116, resulting in clockwise rotation of the output sprocket 116. Clockwise rotation of the output sprocket 116 draws up the chain 16 to apply force to the brake surface 14 and set the take-up mechanism 18.

As the take-up mechanism 18 is being set in the first mode using the electric actuating mechanism 22, the electronic control circuit 32 may monitor the amount of force being applied by the take-up mechanism 18, as previously described. When the take-up mechanism 18 has been adequately set, the electronic control circuit 32 de-energizes the motor 28 and engages the motor brake 30 to inhibit free rotation of the motor 28, motor output shaft 34, and motor driven shaft 36.

Once the take-up mechanism 18 has been set electrically, the torque transfer mechanism 62 and motor brake 30 hold the take-up mechanism 18 in the set position as follows. With the take-up mechanism 18 set, the reactive force in the apparatus 12, i.e., the elasticity in the chain 16, take-up mechanism 18, idler assembly 20, and/or combiner mechanism 26, will attempt to rotate the previously described gears in the opposite, or release, direction. That is, the chain 16 will attempt to rotate the output sprocket 116 counter-clockwise. The output sprocket 116 in turn attempts to rotate the drive gear 102 counter-clockwise. The drive gear 102 in turn attempts to rotate the gears in the idler assembly 20 clockwise. The gears in the idler assembly 20 in turn attempt to rotate the combiner output gear 90 counter-clockwise. The combiner output gear 90 in turn attempts to rotate the planetary gears 86 collectively counter-clockwise around the sun gear 88. The engaged motor brake 30 prevents the motor driven shaft 36, and thus the sun gear 88, from rotating. As a result, the planetary gears 86 attempt to rotate the ring gear 84 counter-clockwise. The ring gear 84 in turn attempts to rotate the manually driven shaft 50 counter-clockwise. However, counter-clockwise rotation of the manually driven shaft 50 only further rotationally binds the manually driven shaft 50 to the clamped pressure plate 66, as previously described with respect to electrically setting the take-up mechanism 18, which inhibits the manually driven shaft 50, and thus the ring gear 84, from rotating counter-clockwise. Therefore, the planetary gears 86 are rotationally bound by the ring gear 84 (inhibited from rotation by the torque transfer mechanism 62) and the sun gear 88 (prevented from rotation by the motor brake 30), and the take-up mechanism 18 is held in the set position.

To release the take-up mechanism 18 electrically, the electronic control circuit 32 electrically shorts the motor 28 and disengages the motor brake 30. The previously described reactive force in the apparatus 12, i.e., the elasticity in the chain 16, take-up mechanism 18, idler assembly 20, and/or combiner mechanism 26, causes the combiner output gear 90 to attempt to rotate the planetary gears 86 collectively counter-clockwise around the sun gear 88. With the ring gear 84 locked from counter-clockwise rotation by the torque transfer mechanism 62, and with the motor brake 30 disengaged, the planetary gears 86 impart counter-clockwise rotation to the sun gear 88 and motor driven shaft 36 to release the force applied by the take-up mechanism 18. Counter-clockwise rotation of the motor driven shaft 36 causes the electrically shorted motor 28 to rotate, generating counter-electromagnetic force in the motor 28. The counter-electromagnetic force generated by the motor 28 dampens the rotation of the motor driven shaft 36 and produces a smooth release of the take-up mechanism 18. After the elasticity in the apparatus 12 and the force applied by the take-up mechanism 18 have been released, for example after approximately 12 seconds, the electronic control circuit 32 removes the electrical short from the motor 28 and energizes the motor 28 to rotate the motor driven shaft 36 counter-clockwise to create slack in the chain 16 and re-set the take-up mechanism 18 for subsequent operation. When the take-up mechanism 18 has been re-set, as determined, for example, by timed counter-clockwise operation of the motor 28 or by optional sensors in the electronic control circuit 32, the electronic control circuit 32 de-energizes the motor 28 and engages the motor brake 30.

The apparatus for operating the take-up mechanism 18 in the second mode using the manual actuating mechanism 24 will now be described with reference to the embodiments shown in FIGS. 1-8. To set the take-up mechanism 18 manually, the operator rotates the hand wheel 52 clockwise as shown in FIG. 1.

Referring to FIGS. 3 and 4, clockwise rotation of the hand wheel 52 imparts clockwise rotation and torque to the manual input shaft 48. The slight clamping force between the pressure plate 66, friction disk 70, and cover 54 created by the springs 72 produces slight rotational movement between the manual input shaft 48 and the pressure plate 66. The slight rotational movement between the manual input shaft 48 and the pressure plate 66 causes the actuating balls 78 to contact opposing surfaces in the depressions 74. The angle of the contact point of the actuating balls 78 with the opposing surfaces in the depressions 74 imparts axial force on the pressure plate 66 away from the manual input shaft 48, reducing the clamping force between the pressure plate 66, friction disk 70, and cover 54. When the operator applies sufficient clockwise torque to the hand wheel 52, the clamping force between the pressure plate 66, friction disk 70, and cover 54 will be completely removed. When the clamping force between the pressure plate 66, friction disk 70, and cover 54 is completely removed, the torque transfer mechanism 62 will transfer the clockwise rotation and torque from the manual input shaft 48, through the actuating balls 78, 80 and the pressure plate 66, to rotate the manually driven shaft 50 clockwise.

Referring to FIGS. 5 and 6, the manually driven shaft 50 fixedly connects to the ring drive plate 82 and ring gear 84. Therefore, clockwise rotation of the manually driven shaft 50 causes the ring drive plate 82 and the ring gear 84 to rotate clockwise. Clockwise rotation of the ring gear 84 causes the planetary gears 86 to rotate clockwise about the idler shafts 94. The engaged motor brake 30 inhibits rotation of the motor driven shaft 36, and thus the sun gear 88. As a result, the clockwise rotation of the planetary gears 86 about the idler shafts 94 causes the planetary gears 86 to collectively rotate clockwise around the sun gear 88. The planetary gears 86 are fixedly connected to the combiner output gear 90, resulting in clockwise rotation of the combiner output gear 90.

Clockwise rotation of the combiner output gear 90 is transmitted to the take-up mechanism 18 to set the take-up mechanism 18 in the same manner as previously described in the first mode of operation using the electric actuating mechanism 22.

Once the take-up mechanism 18 has been set manually, the torque transfer mechanism 62 and motor brake 30 hold the take-up mechanism 18 in the set position, as previously described in the first mode of operation using the electric actuating mechanism 22.

To release the take-up mechanism 18 manually, the operator rotates the hand wheel 52 counter-clockwise as shown in FIG. 1. Referring to FIGS. 3 and 4, counter-clockwise rotation of the hand wheel 52 imparts counter-clockwise rotation and torque to the manual input shaft 48. The slight clamping force between the pressure plate 66, friction disk 70, and cover 54 created by the springs 72 produces slight rotational movement between the manual input shaft 48 and the pressure plate 66. The slight rotational movement between the manual input shaft 48 and the pressure plate 66 causes the actuating balls 78 to contact opposing surfaces in the depressions 74. The angle of the contact point of the actuating balls 78 with the opposing surfaces in the depressions 74 imparts axial force on the pressure plate 66 away from the manual input shaft 48, reducing the clamping force between the pressure plate 66, friction disk 70, and cover 54.

When the operator applies sufficient counter-clockwise torque to the hand wheel 52, the clamping force between the pressure plate 66, friction disk 70, and cover 54 will be partially removed, allowing the pressure plate 66 to slip against the friction disc 70. The reactive force in the apparatus 12, as previously described, will briefly rotate the manually driven shaft 50 and pressure plate 66 counter-clockwise faster than the counter-clockwise rotation of the hand wheel 52 and manual input shaft 48. Continued counter-clockwise rotation of the manually driven shaft 50 faster than the counter-clockwise rotation of the hand wheel 52 and manual input shaft 48 imparts axial force on the pressure plate 66 away from the manually driven shaft 50 to re-establish the clamping force between the pressure plate 66, friction disk 70, and cover 54.

The process repeats as the operator continues to rotate the hand wheel 52 counter-clockwise. Eventually, the force applied by the take-up mechanism 18 will be completely relieved, and the reactive force from the apparatus 12 will no longer rotate the manually driven shaft 50 counter-clockwise. As a result, the clamping force between the pressure plate 66, friction disk 70, and cover 54 will remain completely removed. Continued counter-clockwise rotation and torque applied to the manual input shaft 48 will then be communicated through the torque transfer mechanism 62 to rotate the manually driven shaft 50 counter-clockwise.

Referring to FIG. 5, the manually driven shaft 50 is fixedly connected to the ring drive plate 82 and ring gear 84. Therefore, counter-clockwise rotation of the manually driven shaft 50 causes the ring drive plate 82 and ring gear 82 to rotate counter-clockwise.

Referring to FIG. 6, counter-clockwise rotation of the ring gear 84 causes the planetary gears 86 to rotate counter-clockwise about the idler shafts 94. The engaged motor brake 30 inhibits rotation of the motor driven shaft 36, and thus the sun gear 88. As a result, the counter-clockwise rotation of the planetary gears 86 about the idler shafts 94 causes the planetary gears 86 to collectively rotate counter-clockwise around the sun gear 88. The planetary gears 86 are fixedly connected to the combiner output gear 90, resulting in counter-clockwise rotation of the combiner output gear 90.

Counter-clockwise rotation of the combiner output gear 90 is transmitted to the take-up mechanism 18 to release the brake surface 14 in the same manner as previously described in the first mode of operation using the electric actuating mechanism 22.

It should be appreciated by those skilled in the art that modifications and variations can be made to the embodiments of the invention set forth herein without departing from the scope and spirit of the invention as set forth in the appended claims and their equivalents.

What is claimed is:

1. An apparatus for operating a take-up mechanism in a locomotive braking system, comprising:
   a. a plate, said plate defining first and second surfaces;
   b. a first brake configured for releasable engagement with said plate;
   c. a first set of depressions on said first surface of said plate;
   d. a second set of depressions on said second surface of said plate;
   e. a gear configured for engagement with said first set of depressions on said first surface of said plate so that torque applied to said first set of depressions from said gear increases the engagement between said first brake and said plate;
   f. a motor configured for engagement with said gear so that said gear transmits rotation and torque from said motor to the take-up mechanism in a first mode of operation;
   g. a manual input shaft configured for engagement with said second set of depressions on said second surface of said plate so that said plate transmits rotation and torque from said manual input shaft to said gear to set and release the take-up mechanism in a second mode of operation;
   h. wherein said motor is engaged with said gear during said second mode of operation when setting and releasing the take-up mechanism.

2. The apparatus for operating a take-up mechanism in a locomotive braking system as in claim 1, wherein said motor is engaged with said gear during said first mode of operation when setting and releasing the take-up mechanism.

3. The apparatus for operating a take-up mechanism in a locomotive braking system as in claim 1, further including a second brake engaged with said motor when said motor is de-energized to inhibit rotation of said motor when said motor is de-energized.

4. The apparatus for operating a take-up mechanism in a locomotive braking system as in claim 3, further including an electronic control circuit in operative engagement with at least one of said motor or said second brake for operating the take-up mechanism in said first mode of operation.

5. The apparatus for operating a take-up mechanism in a locomotive braking system as in claim 1, wherein at least one of said first set of depressions or said second set of depressions define a conical surface.

6. The apparatus for operating a take-up mechanism in a locomotive braking system as in claim 1, wherein at least one of said first set of depressions or said second set of depressions define a concave surface.

7. The apparatus for operating a take-up mechanism in a locomotive braking system as in claim 1, further including a set of actuating balls in at least one of said first set of depressions or said second set of depressions.

8. An apparatus for operating a take-up mechanism, comprising:
   a. a plate, said plate defining first and second surfaces;
   b. a first brake in biased engagement with said plate;
   c. a gear configured for engagement with said first surface of said plate;
   d. a motor configured for engagement with said gear so that said gear transmits rotation and torque from said motor to the take-up mechanism in a first mode of operation;
   e. a second set of depressions on said second surface of said plate;
   f. a manual input shaft configured for engagement with said second set of depressions on said second surface of said plate so that torque applied to said manual input shaft in either direction decreases said biased engagement between said first brake and said plate, allowing said plate to transmit rotation and torque from said manual input shaft to said gear to set and release the take-up mechanism in a second mode of operation;
   g. wherein said motor is engaged with said gear during said second mode of operation when setting and releasing the take-up mechanism.

9. The apparatus for operating a take-up mechanism as in claim 8, wherein said motor is engaged with said gear during said first mode of operation when setting and releasing the take-up mechanism.

10. The apparatus for operating a take-up mechanism as in claim 8, further including a second brake engaged with said motor when said motor is de-energized to inhibit rotation of said motor when said motor is de-energized.

11. The apparatus for operating a take-up mechanism as in claim 10, further including an electronic control circuit in operative engagement with at least one of said motor or said second brake for operating the take-up mechanism in said first mode of operation.

12. The apparatus for operating a take-up mechanism as in claim 8, wherein said second set of depressions define a conical surface.

13. The apparatus for operating a take-up mechanism as in claim 8, wherein said second set of depressions define a concave surface.

14. The apparatus for operating a take-up mechanism as in claim 8, further including a set of actuating balls in said second set of depressions.

15. The apparatus for operating a take-up mechanism as in claim 8, further including a first set of depressions on said first surface of said plate.

16. A method for operating a take-up mechanism, comprising:
   a. energizing a motor engaged with a gear to rotate said gear to set the take-up mechanism in a first mode of operation;
   b. manually rotating a manual input shaft engaged with said gear in a first direction to set the take-up mechanism in a second mode of operation;
   c. manually rotating said manual input shaft engaged with said gear in a second direction to release the take-up mechanism in said second mode of operation;
   d. maintaining engagement between said motor and said gear during said second mode of operation to set the take-up mechanism; and
   e. maintaining engagement between said motor and said gear during said second mode of operation to release the take-up mechanism.

17. The method for operating a take-up mechanism as in claim 16, further including maintaining engagement between said motor and said gear during said first mode of operation to set and release the take-up mechanism.

18. The method for operating a take-up mechanism as in claim 16, further including engaging a brake to said motor when said motor is de-energized to inhibit rotation of said motor when said motor is de-energized.

19. The method for operating a take-up mechanism as in claim 18, further including disengaging said brake from said motor to release the take-up mechanism in said first mode of operation.

20. The method for operating a take-up mechanism as in claim 16, further including energizing said motor to rotate said gear to re-set the take-up mechanism in said first mode of operation.

* * * * *